Patented Dec. 5, 1950

2,532,349

UNITED STATES PATENT OFFICE 2,532,349

PESTICIDAL OR INSECT-REPELLENT FUMIGATING COMPOSITIONS

James Taylor, Saltcoats, and John Macfie Holm, West Kilbride, Scotland, assignors to Imperial Chemical Industries Limited, a corporation of Great Britain No Drawing. Application June 25, 1947, Serial No. 757,070. In Great Britain August 14, 1946

7 Claims. (Cl. 167—40)

The present invention relates to fumigating compositions and more particularly to the provision of improved fumigating compositions for the thermal production of fumes of pesticidal or insect-repellant compounds that are capable of vaporisation when suitably heated.

The invention is especially valuable for the purpose of fumigating with combustible pesticidal or insect-repellant compounds or pesticidal or insect-repellant compounds easily decomposed when overheated. The invention, for instance, facilitates the economical production of a fume comprising an aerosol of the condensed vapour of a pesticidal or insect-repellant compound which can deposit on the bounding surfaces of a closed space in which the fume is generated so as to produce a thin layer of the pesticidal or insect-repellant compound that will be active after the atmosphere is clear of the actual fumes.

One example of a pesticide capable of depositing such a layer when a suitable fumigation method is applied to volatilise it, is the very powerful insecticide gamma hexachlorocyclohexane. A further example is the powerful insecticide alpha - alpha-bis-(parachlorophenyl) beta - beta-beta-trichloroethane. Both insecticides can be applied in the form of a smoke by volatilisation from hot plates or by other heating methods. In specification No. 503,377 there is claimed inter alia a method for fumigating an enclosed space to control pests therein which comprises treating the said space with an aerosol containing hexachlorocyclohexane.

The term "pesticidal compound" is intended to cover, for example, insecticides, fungicides, bactericides, and rodenticides.

The object of the present invention is to provide new or improved fumigating compositions which facilitate the effective vaporisation of pesticides or insect-repellant compounds.

It has been found that when admixed with guanidine nitrate and/or nitroguanidine and a sensitiser of the self-sustained thermal decomposition thereof as hereinafter defined unusually high proportions of pesticidal or insect-repellant compounds can be effectively vaporised and the resulting mixtures provide fumigating compositions that can be made to undergo self-sustained flameless thermal decomposition at temperatures high enough to permit substantially the whole of the pesticidal or insect-repellant compound to be vaporised, but not so high as to cause it to undergo excessive destruction during its vaporisation.

By a sensitiser of self-sustained thermal decomposition we mean a material which when admixed with the guanidine nitrate or nitroguanidine enables the mixture, without preliminary massive heating above atmospheric temperature, to undergo a self-sustained progressive thermal decomposition on the application of a small source of local heating at atmospheric pressure.

Salts of chromic acid and chromium sesquioxide are examples of such sensitisers, and the use of ammonium bichromate or chromium sesquioxide is especially advantageous since the resulting composition is non-hygroscopic and free from acid fumes. Numerous other compounds however can be employed as sensitising agents for the self-sustained thermal decomposition of the said guanidine derivative or derivatives in the improved fumigating compositions of the invention, and many of them also give non-hygroscopic compositions free from acid fumes.

As other sensitisers of thermal decomposition of guanidine nitrate and nitroguanidine may be mentioned by way of example: the hypophosphites e. g. ammonium hypophosphite and barium hypophosphite, copper powder and a number of compounds as for instance cuprous oxide, cupric oxide, cuprous chloride, cupric chloride, cuprous oxalate; a number of nickel, silver, tin, selenium and vanadium compounds; sulphur.

As further sensitisers of thermal decomposition of nitroguanidine may be mentioned by way of example a number of salts of the alkali metals, as for example potassium nitrite, sodium nitrite, potassium carbonate, sodium carbonate, the salts of potassium being more active than those of sodium; a number of aluminium compounds as for instance aluminium chloride, lead compounds as for instance lead nitrate; molybdenum compounds as for instance molybdic acid; zinc and its compounds as for instance zinc powder, zinc oxide and zinc carbonate, the two latter being very active.

According to the present invention, therefore, the improved fumigating compositions consist of a mixture comprising a thermally vaporisable pesticidal or insert-repellant compound, the nitrate and/or the nitro derivative of guanidine and a sufficient quantity of a sensitiser of the thermal decomposition of the said guanidine derivative or derivatives to permit a self-sustained flameless thermal decomposition of the said guanidine derivative or derivatives to take place in the presence of the pesticidal or insect-repellant compound and particularly in the presence of high proportions of the pesticidal or insect-repellant compound.

The mixtures are furthermore preferably of such composition that when the said guanidine derivative or derivatives are undergoing thermal decomposition the temperature in the reaction zone is only slightly above the boiling point of the pesticidal or insect-repellant compound at atmospheric pressure. At lower temperatures, there is likely to be incomplete volatilisation of the insecticide or insect-repellant compound while higher temperatures are likely to produce excessive decomposition of the pesticide or insect-repellant compound.

Nitroguanidine can be sensitized to give a self-sustained reaction at atmospheric pressure by the addition of about 5% of ammonium bichromate or 5% of chromium sesquioxide, but we prefer to use considerably higher proportions in the mixture since this permits the inclusion of correspondingly larger proportions of the pesticidal or insect-repellant compound.

Particularly satisfactory results have been achieved with fumigating composition comprising a mixture containing about 50% insecticide and about 50% of a mixture consisting of equal proportions of nitroguanidine and ammonium bichromate or of guanidine nitrate and ammonium bichromate.

The chromium sesquioxide is conveniently obtained from the self-sustained decomposition of ammonium bichromate at atmospheric pressure, the theoretical yield being 60%.

Potassium chromate and bichromate are also effective as sensitisers but generally require higher proportions.

Guanidine nitrate can be sensitised by about 15% of ammonium bichromate, potassium chromate, and bichromate, or 5–10% chromium sesquioxide but considerably higher proportions are preferred in order to enable the pesticidal or insect-repellant compound content to be as large as practicable.

A cartridge made up from the compositions and provided with a casing may advantageously be employed, and such cartridge may advantageously include a small piece of fuse or of quick match composition or other igniting composition in contact with the fumigating charge in order to facilitate the ignition of the latter from an ordinary domestic friction match, electric fusehead or other source of ignition. The fumigating charge may be in loose powder or compact form, and for its production in compact form the pulverulent mixture of ingredients may be subjected to compression. Alternately the mixture may be made into compact form with the aid of a binder or bonding agent, and may be extruded or moulded into form. Preferably the fumigating charge may conveniently be lightly compacted in a cartridge having a paper, cellophane, or other suitable wrapper or envelope.

When the compositions contain only non-hygroscopic ingredients it is unnecessary to waterproof the cartridges or to pellet the compositions.

When a local portion of the charge is heated by the ignition of the quick match composition or the like or the piece of fuse, or by touching it with a piece of hot metal or the like, a gas evolving decomposition of the guanidine nitrate and/or nitro-guanidine accompanied by the evolution of the pesticidal fume and unaccompanied by flame, will propagate itself through the charge. The fumigating charges provided according to the present invention are therefore both safe and convenient for application in confined space.

The invention is illustrated by the following examples in which the parts are by weight.

The hexachlorocyclohexane employed consists of a mixture of the four isomers, alpha, beta, gamma and delta, the gamma isomer, the active insecticide, being present to the extent of about 10–12 per cent. The alpha-alpha-bis-(parachlorophenyl) beta - beta - beta-trichloroethane employed is the commercial product containing normally about 80% of the active insecticide.

EXAMPLE I

An intimate mixture of 25 parts of nitroguanidine, 25 parts pulverulent ammonium bichromate and 50 parts of hexachlorocyclohexane or alpha-alpha-bis-(parachlorophenyl) beta-beta-beta-trichloroethane is lightly compacted into 10 gram cartridges, 29 mm. in diameter and 21–27 mm. high. The cartridge wrapping consists of two or more layers of cellophane about 0.045 mm. thick. Ignition of the cartridges is effected direct from quick match. From Table I it will be seen that these cartridges give self-sustained reactions at temperatures slightly higher than the estimated average boiling point of the mixture of the isomers in hexachlorocyclohexane, namely about 310° C.

Table I

| Components | Percentage | Bulk Density, gm./cc. | Approx. speed of propagation, mm./sec. | Approx. Max. Temp. in reaction zone | Remarks |
|---|---|---|---|---|---|
| | | | | °C. | |
| Nitroguanidine | 25 | | | | No flame. Dense white smoke. Occasional incandescent particles in reaction zone. |
| Ammonium bichromate | 25 | 0.71 | 0.45 | 350 | |
| Hexachlorocylohexane | 50 | | | | |
| Nitroguanidine | 25 | | | | |
| Ammonium bichromate | 25 | 0.57 | 0.55 | 320 | Same as above. |
| Alpha-alpha-bis-(parachlorophenyl) beta-beta-beta-trichloroethane. | 50 | | | | |

EXAMPLE II

An intimate mixture of 27.5 parts guanidine nitrate, 27.5 parts pulverulent ammonium bichromate, and 45 parts of hexachlorohexane or alpha-alpha-bis-(parachlorophenyl) beta-beta-beta-trichloroethane is lightly compacted into 10 gram cartridges, 29 mm. in diameter and 18–20 high. The cartridge wrapping consists of two or more layers of cellophane about 0.045 mm. thick. From Table II it will be seen that these cartridges give self-sustained reactions at temperatures slightly higher than the estimated average boiling point of the mixture of the isomers in hexachlorocyclohexane, namely about 310° C.

Table II

| Components | Percentage | Bulk Density, gm./cc. | Speed of propagation, mm./sec. | Approx. Max. Temp. in reaction zone | Remarks |
|---|---|---|---|---|---|
| | | | | °C. | |
| Guanidine nitrate | 27.5 | | | | No flame. Dense white smoke. Occasional incandescent particles in reaction zone. |
| Ammonium bichromate | 27.5 | 0.84 | 0.22 | 320 | |
| Benzene hexachlorocyclohexane | 45.0 | | | | |
| Guanidine nitrate | 27.5 | | | | |
| Ammonium bichromate | 27.5 | 0.76 | 0.18 | 320 | Same as above. |
| Alpha-alpha-bis-(parachlorophenyl)-beta-beta-beta-trichloroethane | 45.0 | | | | |

EXAMPLE III

An intimate mixture of 69.5 parts guanidine nitrate, 20 parts benzene hexachlorocyclohexane, 10 parts cuprous chloride, 0.5 part long asbestos fibre are compacted into 35 gram pellets 24 mm. in diameter and about 47 mm. high. These cartridges are provided at one end with a layer of about 1 gram of an igniting composition consisting of 30 parts silicon and 70 parts red lead. These cartridges give self-sustained reaction at temperatures of about 350° C.

EXAMPLE IV

An intimate mixture of 42 parts of guanidine nitrate, 28 parts barium hypophosphate and 30 parts of benzene hexachlorohexane is compressed into 23.3 gm. cylindrical pellets, 24 mm. in diameter and about 30 mm. high under a total load of about 3 tons. When ignited by a fusee or the 30:70 silicon-red lead igniting composition a self-sustained decomposition takes place with the evolution of a dense white cloud containing the condensed vapour of the insecticidal benzene hexachlorocyclohexane.

We claim:

1. A fumigating composition consisting of a mixture comprising a thermally vaporizable pesticidal compound, at least one nitrogen-containing compound selected from the group consisting of nitroguanidine and guanidine nitrate, and a quantity of a thermal decomposition sensitizer of from 5% to 100% of the weight of the nitrogen-containing compound present, said quantity being sufficient to permit a self-sustained flameless thermal decomposition of said nitrogen-containing compounds in the presence of said pesticidal compound.

2. A fumigating composition as set forth in claim 1 wherein the relative proportions of the ingredients therein are such that the nitrogen-containing compound undergoes thermal decomposition at a temperature slightly above the boiling point of the pesticidal compound at atmospheric pressure.

3. A fumigating composition as set forth in claim 1 wherein the sensitizer is ammonium dichromate.

4. A fumigating composition as set forth in claim 1 wherein the sensitizer is chromium sesquioxide.

5. A fumigating composition as set forth in claim 1 wherein the mixture comprises substantially 50% by weight of said insecticide, 25% by weight of at least one of said nitrogen-containing compounds, and 25% by weight of said sensitizer.

6. A fumigating composition as set forth in claim 1 wherein the said pesticidal compound is alpha-alpha-bis-(parachlorophenyl)-beta - beta-beta-trichlorethane.

7. A fumigating composition as set forth in claim 1 wherein the said pesticidal compound is hexachlorocyclohexane.

JAMES TAYLOR.
JOHN MACFIE HOLM.

REFERENCES CITED

The following references are of record in the file of this patent:

UNITED STATES PATENTS

| Number | Name | Date |
|---|---|---|
| 1,507,434 | Schollmeyer | Sept. 2, 1924 |
| 1,652,291 | Tanner | Dec. 13, 1927 |
| 2,159,234 | Taylor | May 23, 1939 |
| 2,165,263 | Holm | July 11, 1939 |
| 2,434,872 | Taylor | Jan. 20, 1948 |
| 2,440,082 | Flanders | Apr. 20, 1948 |

OTHER REFERENCES

Slade, "Gamma Isomer of Hexachl...," Chemistry & Industry, Oct. 13, 1945, pages 314–319; page 317 especially pertinent.